even evaporable alcohol, other alcohols and other rapidly evaporable liquids may be used.

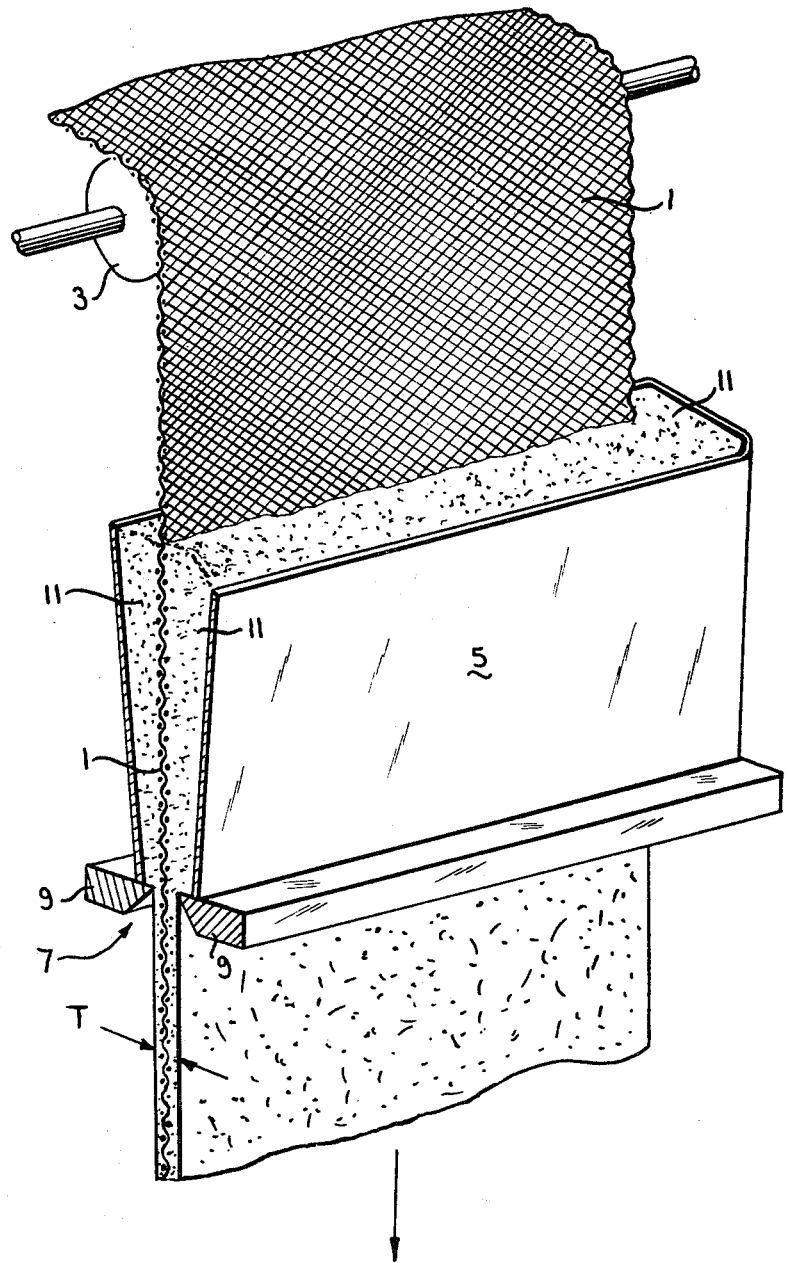

United States Patent Office
3,393,096
METHOD OF MANUFACTURING A POROUS PLAQUE
Ernest M. Jost, Attleboro, Mass., assignor to Texas Instruments Incorporated, Dallas, Tex., a corporation of Delaware
Filed Oct. 24, 1965, Ser. No. 504,604
3 Claims. (Cl. 136—29)

This invention relates to substrate material for use as an electrode in electrochemical apparatus, and more particularly to such material of the plaque type.

Among the several objects of the invention may be noted the provision of a low-cost method for producing strong, highly porous but compact electrode material of the plaque type which may be manufactured with less variation in thickness than heretofore and which is therefore of improved uniformity of electrochemical capacity. Other objects and features will be in part apparent and in part pointed out hereinafter.

The invention accordingly comprises the product and methods hereinafter described, the scope of the invention being indicated in the following claims.

In the accompanying drawing, in which one of various possible embodiments of the invention is illustrated, the single figure diagrammatically illustrates coating apparatus for carrying out the invention, the same being in perspective, partly in section.

Low-cost control of thickness and a very high porosity are desirable for plaques used in battery, fuel cell and other electrochemical applications. Minimal thickness consistent with high porosity is desirable. The known type of carbonyl-nickel plaques used in nickel-cadmium batteries should have porosities in excess of approximately 80% and well-controlled thickness dimensions; for otherwise the active material loading is too small and results in plaques with substandard electrochemical capacities. The porosity described in this application is the available rather than the absolute porosity and is measured in one of two ways. The so-called wax-difference method, the plaque is impregnated in vacuum with hot wax of known density. The liquid wax fills all available interconnected pores. The impregnated plaque is allowed to cool, whereby the wax solidifies, and is weighed. The weight difference is a measure of the available pore volume. In the second method, the plaque is impregnated in vacuum by pressing mercury into its pores. In this case the mercury volume difference rather than the weight is used as the measure of available pore volume. Carbonyl-nickel powder is produced by decomposition of nickel-carbonyl gas. This powder has a fibrous structure and an extremely low apparent density, typically between .5 to 1 gram per cubic centimeter.

At present the high porosity required is achieved by loose-sintering carbonyl-nickel powders around and on a supporting wire mesh. This is accomplished for example by deposting an even spread to form a layer of carbonyl-nickel powder in a graphite mold. A supporting metal open wire or like mesh is then located on this layer and covered with another spread in the form of a layer of carbonyl-nickel powder, the whole being thereafter sintered in a furnace preferably at 1400° F. to 2000° F. from 15 to 30 minutes. It will be understood that sintering may take place at as low a temperature as 800° F. and also at temperatures greatly exceeding 2000° F. with an accompanying varied time. The sintering bonds the carbonyl-nickel particles so that the resulting plaque or electrochemically inert substrate is self-sustaining. This method provides for a satisfactory porosity in excess of approximately 80% but the resulting plaque or substrate thicknesses are excessive. Moreover, dimensions are not well controlled.

The continuous applications of metal-powder slurries on supporting wire mesh is a more desirable process but it has not found general use because the porosity of the plaques thus made is considerably smaller than the porosity achieved by means of the above-described process. For example, porosity is generally in the less desirable lower range of approximately 75% to 80% when the slurry method is used under comparable sintering conditions. I have discovered that the reason for this is that the composition of the slurry largely affects both porosity and the degree of thickness control that may be obtained.

For example, in carrying out my invention a slurry is made up comprising carbonyl-nickel powder, polyethylene oxide, methyl alcohol (methanol) and water. A typical polyethylene oxide is the Polyox 205 brand made by the Union Carbide Company. As a specific example, 40 grams of polyethylene oxide (Polyox) is dissolved in 300 ml. of methyl alcohol, which rapidly provides a lump-free dispersion. To this is added 100 ml. of water, which has a thickening effect. This results in a binder having a viscosity on the order of 156,000 cps. There is then added to this mixture 270 grams of carbonyl-nickel powder such as sold under the trademark Inco type 287. After the addition of the carbonyl-nickel powder to the binder solution, the aggregate is stirred sufficiently to obtain a substantially homogeneous mixture in slurry form of viscosity which is substantially more than the above-mentioned 156,000 cps. An acceptable range is 300,000 to 1,000,000 cps. Variations in this range depend upon variations in the proportions of the materials used in the slurry make-up method of mixing and aging, to be commented upon below.

Next the slurry is continuously applied as an infilling, for example, on and in a 20 x 20 woven wire mesh made of 7-mil diameter nickel wire. The term 20 x 20 mesh means 20 wires per inch in both directions in the mesh. The drawing illustrates how application may be accurately and rapidly performed, namely, by moving a strip 1 of the mesh over a guide roll 3, moving it down through a wedge-shaped container 5 and out of its lower outlet 7. The outlet is flanked by straight leveling blades 9. The container 5 holds the mass 11 of slurry and blades 9 serve to apply and level the slurry 11 on opposite sides of the mesh strip 1 thinly and accurately. The finished thickness T may, for example, be 25 mils. The slurry-infilled wire mesh is then allowed to dry. The resulting dry composite is then sintered at about 1600° F. for approximately 15 minutes. This constitutes an electrochemically inert substrate. The resulting porosity is approximately 84% for a double-coated strip having a preferred thickness range of 20 mils to 30 mils plus or minus 1 mil at a 2 sigma level. This means that, statistically, over 95% of all thickness readings are within plus or minus 1 mil. It will be understood that other thicknesses are possible.

It will be understood, as regards the mesh, that instead of being of wire form it may be of other suitable forms, provided the hardened slurry can properly interlock therewith. It will be also understood that the strip formed as illustrated at the bottom of the drawing is later segmented to form individual plaques.

The reason for the good results obtained by use of methyl alcohol (methanol) as part of the slurry lies first in its rapid and complete suspension effect on polyethylene oxide, leaving no lumps; and second in the fast evaporation rate of alcohol, combined with its high heat of vaporization, which tends to cool the strip as it dries and therefore rapidly congeals and solidifies the slurry in place on the wire mesh. This prevents irregular sloughing or running of the slurry on the mesh, with resulting high accuracy in thickness. Although methyl alcohol has been mentioned as a preferred, rapidly evaporative diluent, ethyl alcohol or acetone may also be used.

The mesh used serves several purposes. First, it strengthens the dried and sintered substrate. Secondly, it restricts shrinking of the slury to two-plane dimensions as it is dried and sintered. Thus a plaque containing a nickel or like wire mesh shrinks only in the thickness dimension and not substantially in the width and length dimensions. This minimizes thickness variations, the shrinkage being even throughout the area of the strip.

It will be understood that the formulation above given is subject to variations. Thus for any specified methanol-to-water ratio within the following preferred range, the slurry viscosity can be changed by changing the content of polyethylene oxide. However, when the amount of this oxide is once fixed upon, the viscosity does not change much for said specified range of the methanol-to-water ratio. To this end a preferred range is from a volume ratio of 25% water to 75% methanol on the one hand, to a volume ratio of 75% water and 25% methanol on the other hand. The viscosity variation for 10% polyethylene oxide solution within this range is small, being in the range of about 750,000 to 850,000 cps. for fresh slurries. It drops upon ageing, for example, for fourteen days in the range from 700,000 to 750,000 cps. The viscosity is greatly affected by the method of mixing. For best results high speed mixing methods which tend to shear the polymer and lower viscosity should be avoided. We have found that slow kneading-type mixers are optimal for our purpose. Additional typical formulations in accordance with the above guide lines are as follows:

| | | |
|---|---|---|
| Methanol | ml | 100 |
| Water | ml | 300 |
| Polyethylene oxide | gr | 40 |
| Carbonyl-nickel powder | gr | 260 | and

| | | |
|---|---|---|
| Methanol | ml | 300 |
| Water | ml | 100 |
| Polyethylene oxide | gr | 40 |
| Carbonyl-nickel powder | gr | 260 |

The nickel-powder content of the slurry influences the porosity of the sintered plaque. As the nickel content of the slurry decreases, the porosity increases. However, the slurry viscosity decreases with a reduced nickel-powder content. Thus the viscoisity becomes too low for practical purposes when the nickel-powder content per 400 ml. of the nickel-water-polyethylene oxide solution is about 200 gr. of nickel powder. I have found that for good process control, the slurry viscosity should be higher than 200,000 cps. and preferably higher than 500,000 cps.

The outside limits of the methanol-water ratio in the slurry may range from 95:5 to 5:95 ml. The volume of the nickel-powder content should be in the range of 50 to 100% of the volume of the methanol-water-polyethylene oxide solution, based upon a density of the powder content of unity relative to that of the solution.

It will be understood that the electrochemical inactive substrate formed as described above must be activated for use by impregnating it with a suitable activating substance, such as an oxide. How this is done will be obvious to those skilled in the art. Thus in the case of a nickel-cadmium battery, if the substrate is to become a positive electrode it will be impregnated with a nickel oxide, the substrate material being nickel. If the plaque is to be a negative electrode it will be impregnated with cadmium oxide, the substrate material being nickel.

In view of the above, it will be seen that the several objects of the invention are achieved and other advantageous results attained.

As various changes could be made in the above product and methods without departing from the scope of the invention, it is intended that all matter contained in the above description or shown in the accompanying drawing shall be interpreted as illustrative and not in a limiting sense.

What is claimed is:

1. The method of manufacturing a porous plaque type of substrate material for electrochemical apparatus, comprising forming and stirring a mixture of polyethylene oxide, a solvent, nickel powder and water to form a slurry, the polyethylene oxide and solvent being mixed and stirred to form a lump-free dispersion before the addition of the water, the water transforming the dispersion into a thickened solution of viscosity substantially greater than that of the dispersion, the presence of the powder in the slurry providing additional viscosity, said solvent being selected from the group consisting of methyl alcohol, ethyl alcohol and acetone, applying the slurry to a supporting mesh, leveling the slurry on the mesh, drying the leveled slurry on the mesh, thereby evaporating the water and the solvent to make the dried slurry substantially porous, and sintering the dried slurry carried by the mesh.

2. The method of manufacturing a porous plaque type of substrate material for electrochemical apparatus, comprising forming and stirring a mixture of polyethylene oxide, a solvent, carbonyl-nickel powder and water to form a slurry, the polyethylene oxide and solvent being mixed and stirred to form a lump-free dispersion before the addition of the water, the water transforming the dispersion into a thickened solution of viscosity substantially greater than that of the dispersion, the presence of the powder in the slurry providing additional viscosity, said solvent being selected from the group consisting of methyl alcohol, ethyl alcohol and acetone, the solvent-water ratio ranging from 5:95% to 95:5%, applying the viscous slurry to both sides of a supporting metal mesh, leveling the viscous slurry on each side of the mesh, drying the leveled slurry on the mesh, thereby evaporating the water and the solvent to make the dried slurry substantially porous, and sintering the dried slurry carried by the mesh.

3. The method of manufacturing a porous plaque type of substrate material for electrochemical apparatus, comprising forming and stirring a mixture of polyethylene oxide, a solvent carbonyl-nickel powder and water to form a slurry, the polyethylene oxide and solvent being mixed and stirred to form a lump-free dispersion before the addition of the water, the water transforming the dispersion into a thickened solution of viscosity substantially greater than that of the dispersion, the presence of the powder in the slurry providing additional viscosity, said solvent being selected from the group consisting of methyl alcohol, ethyl alcohol and acetone, the solvent-water ratio ranging from 5:95% to 95:5%, the powder content being in the range of 50 to 100% by volume of the thickened solution formed by the water and the dispersion, based upon a density of the powder content substantially equal to that of the solution, to produce a viscosity in the slurry greater than 300,000 cps., applying the viscous slurry on both sides of a supporting metal mesh, leveling the viscous slurry on each side of the mesh, drying the leveled slurry on the mesh, thereby evaporating the water and the solvent to make the dried slurry substantially porous, and sintering the dried slurry carried by the mesh.

References Cited

UNITED STATES PATENTS

| | | | |
|---|---|---|---|
| 2,775,566 | 12/1956 | Crowley | 260—19 |
| 2,794,735 | 6/1957 | Schlecht et al. | 136—28 |
| 2,836,641 | 5/1958 | Vogt | 136—20 |
| 2,979,400 | 4/1961 | Mouwen | 75—222 |
| 3,132,054 | 5/1964 | Carson | 136—120 |
| 3,181,973 | 5/1965 | Duddy | 136—86 |

WINSTON A. DOUGLAS, *Primary Examiner.*

A. SKAPARS, *Assistant Examiner.*